United States Patent
Han et al.

(10) Patent No.: US 8,773,614 B2
(45) Date of Patent: Jul. 8, 2014

(54) TWO-WAY LIQUID CRYSTAL DISPLAY DEVICE

(75) Inventors: Jae-Jung Han, Seoul (KR); Min-So Jo, Seoul (KR); Dae-Il Kang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 221 days.

(21) Appl. No.: 13/339,995

(22) Filed: Dec. 29, 2011

(65) Prior Publication Data

US 2012/0169967 A1    Jul. 5, 2012

(30) Foreign Application Priority Data

Jan. 3, 2011    (KR) .................. 10-2011-0000227

(51) Int. Cl.
*G02F 1/1335*    (2006.01)
*G02F 1/1333*    (2006.01)

(52) U.S. Cl.
CPC ........ *G02F 1/133615* (2013.01); *G02F 1/1333* (2013.01); *G02B 6/005* (2013.01); *G02B 6/0076* (2013.01); *G02F 2001/133342* (2013.01); *G02B 6/0063* (2013.01); *G02B 6/0046* (2013.01)
USPC ................. 349/62; 349/74; 362/615

(58) Field of Classification Search
CPC ................................................. G02F 1/133603
USPC .................. 349/62, 73, 74, 58, 113, 114, 65; 362/609
See application file for complete search history.

(56) References Cited

U.S. PATENT DOCUMENTS

| | | | |
|---|---|---|---|
| 6,580,488 B2 * | 6/2003 | Kim | 349/143 |
| 7,077,536 B2 * | 7/2006 | Konomi | 362/29 |
| 7,156,546 B2 | 1/2007 | Higashiyama | |
| 7,193,666 B2 * | 3/2007 | Choi et al. | 349/74 |
| 7,290,918 B2 | 11/2007 | Han et al. | |
| 7,347,605 B2 * | 3/2008 | Higashiyama | 362/561 |
| 7,380,953 B2 | 6/2008 | Onishi et al. | |
| 2002/0016084 A1 | 2/2002 | Todd | |
| 2002/0064037 A1 | 5/2002 | Lee | |

(Continued)

FOREIGN PATENT DOCUMENTS

| | | |
|---|---|---|
| CN | 1639618 A | 7/2005 |
| CN | 1664670 A | 9/2005 |

(Continued)

OTHER PUBLICATIONS

CN Office Action issued Feb. 27, 2014.

*Primary Examiner* — Edward Glick
*Assistant Examiner* — Sang V Nguyen
(74) *Attorney, Agent, or Firm* — Morgan, Lewis & Bockius LLP

(57) ABSTRACT

A two-way liquid crystal display device includes first and second liquid crystal panels; a backlight unit disposed between the first and second liquid crystal panels and including an LED assembly and a light guide plate, wherein the LED assembly is disposed at a side surface of the light guide plate and the light guide plate includes predetermined patterns at first and second surfaces thereof facing the first and second liquid crystal panels, respectively; and a support main including a first part guiding the first liquid crystal panel and a second part guiding the second liquid crystal panel and the back light unit, wherein light emitted from the LED assembly is guided by the light guide plate and is provided to the first and second liquid crystal panels.

20 Claims, 10 Drawing Sheets

(56) References Cited

U.S. PATENT DOCUMENTS

| | | | |
|---|---|---|---|
| 2002/0111195 A1 | 8/2002 | Kweon et al. | |
| 2003/0103174 A1 | 6/2003 | Han et al. | |
| 2004/0017529 A1 | 1/2004 | Choi et al. | |
| 2004/0062027 A1 | 4/2004 | Kim et al. | |
| 2004/0100423 A1 | 5/2004 | Nagakubo et al. | |
| 2005/0024844 A1* | 2/2005 | Oh | 362/31 |
| 2005/0041179 A1 | 2/2005 | Suzuki | |
| 2005/0068486 A1 | 3/2005 | Ono | |
| 2005/0073627 A1* | 4/2005 | Akiyama | 349/65 |
| 2006/0114692 A1* | 6/2006 | Han et al. | 362/616 |
| 2007/0097296 A1* | 5/2007 | Li et al. | 349/114 |
| 2008/0165306 A1* | 7/2008 | Kang et al. | 349/62 |
| 2008/0170172 A1* | 7/2008 | Okuda | 349/59 |
| 2008/0219025 A1* | 9/2008 | Spitzer et al. | 362/609 |
| 2008/0259249 A1* | 10/2008 | Chang | 349/65 |
| 2009/0201442 A1* | 8/2009 | Onishi et al. | 349/64 |
| 2009/0316082 A1* | 12/2009 | Bae et al. | 349/74 |
| 2010/0271838 A1* | 10/2010 | Yamaguchi | 362/602 |

FOREIGN PATENT DOCUMENTS

| | | |
|---|---|---|
| CN | 101846845 A | 9/2010 |
| JP | 05-053203 | 3/1993 |
| JP | 2001-358139 | 12/2001 |
| JP | 2002-281605 | 9/2002 |
| JP | 2003-146317 | 5/2003 |
| JP | 2004219985 A | 8/2004 |
| KR | 10-0402790 B1 | 10/2003 |
| KR | 10-0432009 B1 | 5/2004 |
| KR | 10-0578771 B1 | 5/2006 |
| KR | 10-0689377 B1 | 3/2007 |
| KR | 10-0723111 B1 | 5/2007 |
| KR | 10-0765662 B1 | 10/2007 |
| KR | 10-0828531 B1 | 5/2008 |
| KR | 10-0875567 B1 | 12/2008 |
| KR | 10-0887635 B1 | 3/2009 |
| KR | 10-0911082 B1 | 8/2009 |
| KR | 10-0927015 B1 | 11/2009 |
| KR | 10-0948620 B1 | 3/2010 |
| KR | 10-0953424 B1 | 4/2010 |
| KR | 10-1016564 B1 | 2/2011 |

* cited by examiner

TWO-WAY LIQUID CRYSTAL DISPLAY DEVICE

The application claims the benefit of Korean Patent Application No. 10-2011-0000227 filed in Korea on Jan. 3, 2011, which is hereby incorporated by reference for all purposes as if fully set forth herein.

BACKGROUND

1. Field of the Disclosure

The disclosure relates to a liquid crystal display device, and more particularly, to a two-way liquid crystal display device that displays images in both directions.

2. Discussion of the Related Art

Liquid crystal display (LCD) devices are most widely used for monitors of notebook computers, monitors of personal computers and televisions due to excellent moving images and high contrast ratio. LCD devices use the optical anisotropy and polarization properties of liquid crystal molecules of a liquid crystal layer to produce an image.

An LCD device includes two substrates spaced apart and facing each other and a liquid crystal layer interposed between the two substrates. The alignment direction of the liquid crystal molecules is controlled by varying the intensity of an electric field applied to the liquid crystal layer, and the transmittance of light through the liquid crystal layer is changed.

The LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units are classified into an edge type and a direct type according to the position of a light source with respect to the LC panel. In edge-type backlit units, one or a pair of lamps are disposed at one side surface or each of two side surfaces of a light guide plate. In direct-type backlight units, a plurality of lamps are disposed directly under an LC panel.

The edge-type backlight units are easily fabricated, are thin, have light weights, and have low power consumption as compared with the direct-type backlight units.

FIG. 1 is a cross-sectional view of illustrating a liquid crystal display (LCD) device including an edge-type backlight unit according to the related art.

In FIG. 1, the related art LCD device includes a liquid crystal panel 10, a backlight unit 20, a support main 30, a top cover 40 and a cover bottom 50.

The liquid crystal panel 10 displays images and includes first and second substrates 12 and 14 facing and attached to each other with a liquid crystal layer (not shown) interposed therebetween. Polarizers 19a and 19b are attached at front and rear surfaces of the liquid crystal panel 10 and control the polarization of light.

The backlight unit 20 is disposed at a rear side of the liquid crystal panel 10. The backlight unit 20 includes an LED assembly 29, a reflection sheet 25, a light guide plate 23 and a plurality of optical sheets 21. The LED assembly 29 is disposed at a side surface of the light guide plate 23. The LED assembly 29 includes a plurality of LEDs 29a emitting white light and an LED printed circuit board 29b, which will be referred to as a PCB and on which the LEDs 29a are mounted. The reflection sheet 25 is disposed over the cover bottom 50 and is white- or silver-colored. The light guide plate 23 is disposed over the reflection sheet 25. The plurality of optical sheets 21 are disposed over the light guide plate 23.

Light incident on the light guide plate 23 from the LEDs 29a is widely spread in the light guide plate 23 by being totally reflected several times, and is provided to the liquid crystal panel 10 as a plane light source.

Edges of the liquid crystal panel 10 and the backlight unit 20 are surrounded by the support main 30 having a rectangular frame shape. The top cover 40 covers edges of the front surface of the liquid crystal panel 10, and the cover bottom 50 covers a rear surface of the backlight unit 20. The top cover 40 and the cover bottom 50 are combined with the support main 30 to thereby constitute one-united body.

The edge-type backlight unit 20 has light weight and low power consumption and needs low driving voltages, and the edge-type backlight unit 20 is widely used for various electronic devices.

Meanwhile, two-way liquid crystal display devices, which display the same image or different images in both directions, have been actively developed.

The two-way liquid crystal display device, beneficially, includes the edge-type backlight unit 20 for its light weight and thin thickness.

SUMMARY OF THE INVENTION

Accordingly, the present invention is directed to a two-way liquid crystal display device that substantially obviates one or more of the problems due to limitations and disadvantages of the related art.

An advantage of the present invention is to provide a two-way liquid crystal display device that has light weight, thin thickness and low power consumption.

Another advantage of the present invention is to provide a two-way liquid crystal display device that reduces the manufacturing costs and improves efficiency of the manufacturing processes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a two-way liquid crystal display device includes first and second liquid crystal panels; a backlight unit disposed between the first and second liquid crystal panels and including an LED assembly and a light guide plate, wherein the LED assembly is disposed at a side surface of the light guide plate and the light guide plate includes predetermined patterns at first and second surfaces thereof facing the first and second liquid crystal panels, respectively; and a support main including a first part guiding the first liquid crystal panel and a second part guiding the second liquid crystal panel and the back light unit, wherein light emitted from the LED assembly is guided by the light guide plate and is provided to the first and second liquid crystal panels.

In another aspect, a two-way liquid crystal display device includes first and second liquid crystal panels; a backlight unit disposed between the first and second liquid crystal panels and including an LED assembly and first and second light guide plates, wherein the LED assembly is disposed at side surfaces of the first and second light guide plates; and a support main including a first part guiding the first liquid crystal panel and a second part guiding the second liquid crystal panel and the back light unit, wherein light emitted from the LED assembly is guided by the first and second light guide plates and is provided to the first and second liquid crystal panels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to embodiments of the present invention, examples of which are illustrated in the accompanying drawings.

Figure 1:
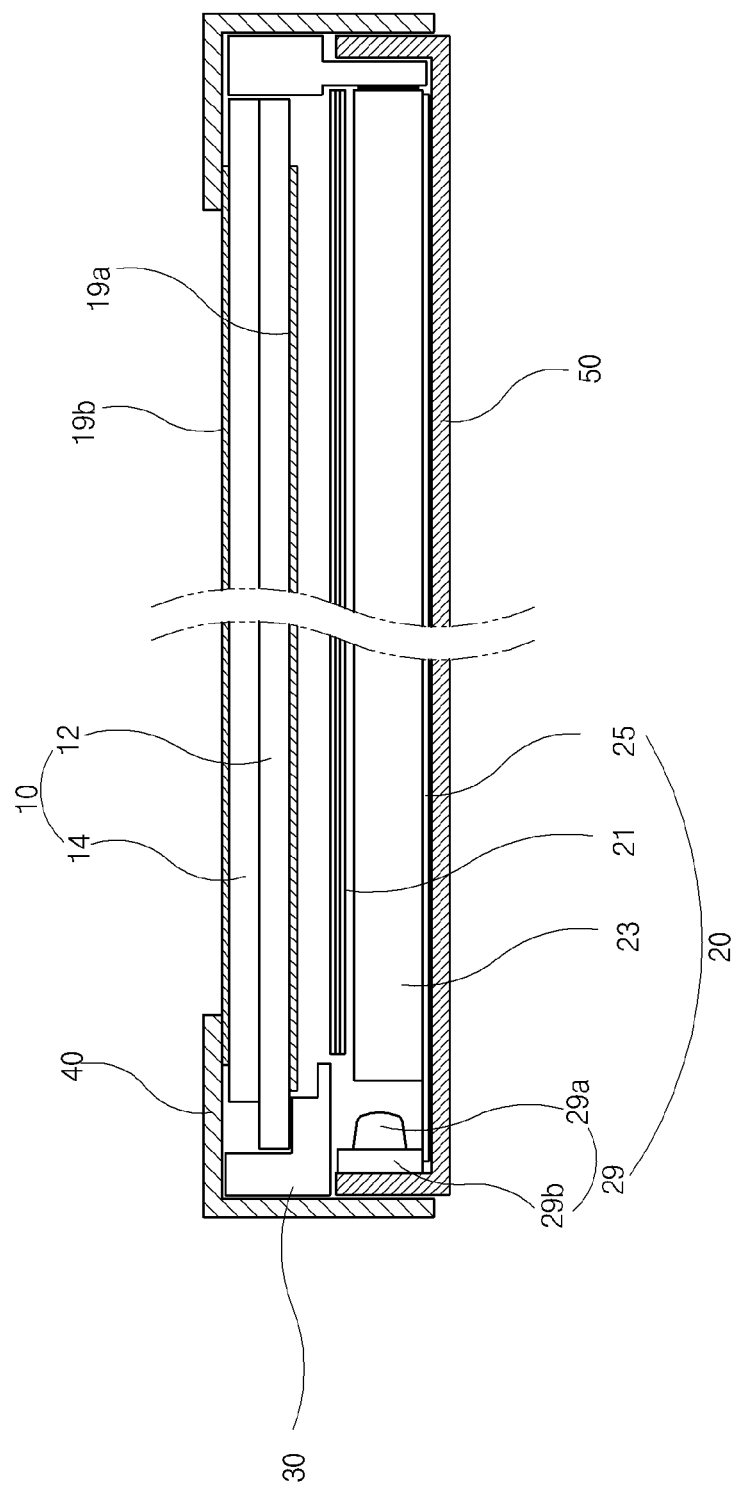
FIG. 1 is a cross-sectional view of illustrating a liquid crystal display (LCD) device including an edge-type backlight unit according to the related art.
Figure 2:
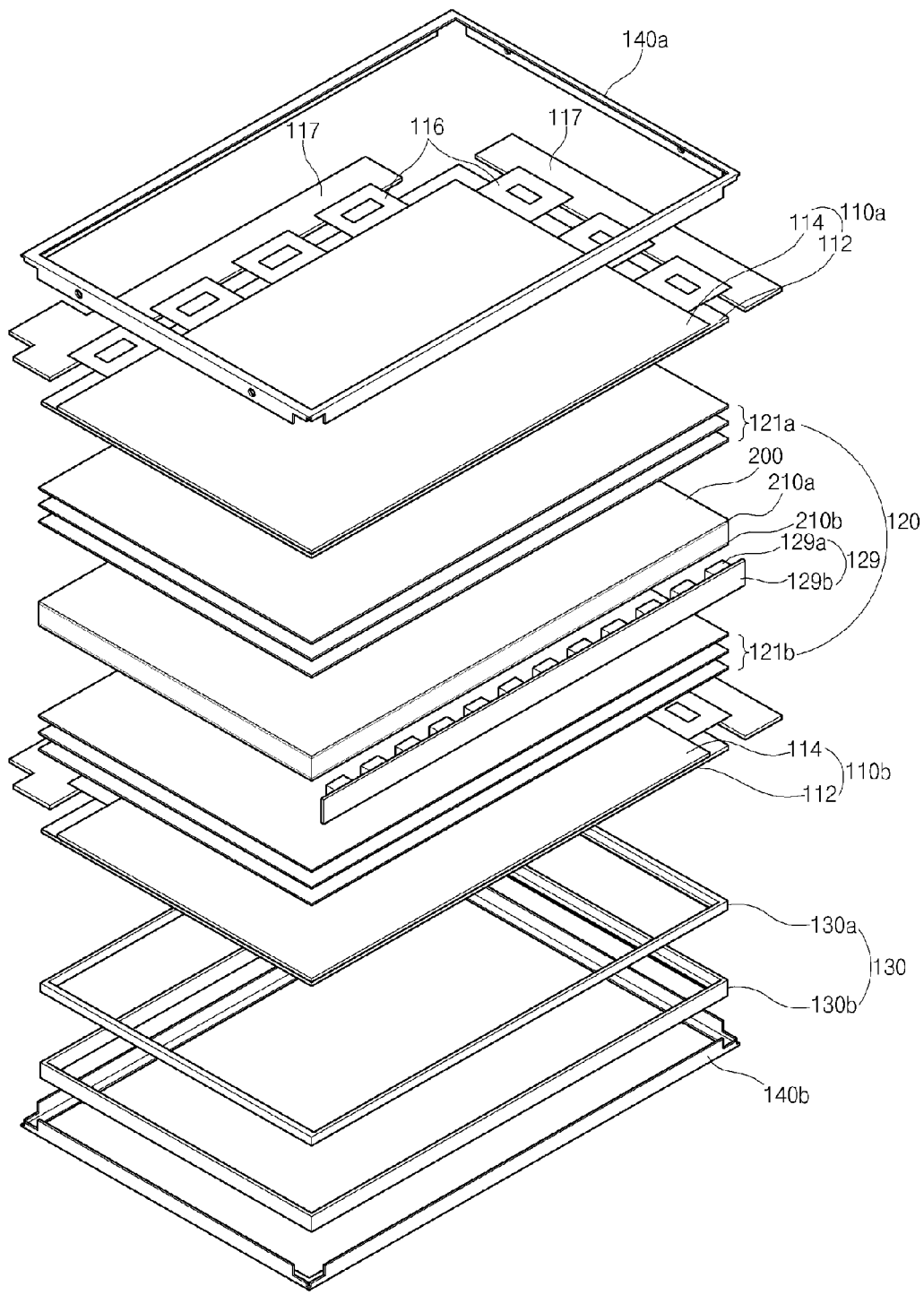
FIG. 2 is an exploded perspective view of illustrating a two-way LCD device according to a first embodiment of the present invention.

FIG. 2 is an exploded perspective view of illustrating a two-way LCD device according to a first embodiment of the present invention.

In FIG. 2, a two-way LCD device includes first and second liquid crystal panels 110a and 110b, a backlight unit 120, a support main 130, and first and second top covers 140a and 140b.

More particularly, the first and second liquid crystal panels 110a and 110b display images. Each of the first and second liquid crystal panels 110a and 110b includes first and second substrates 112 and 114 facing and attached to each other with a liquid crystal layer interposed therebetween.

In an active matrix-type, although not shown in the figure, gate lines and data lines are formed on an inner surface of the first substrate 112, which may be referred to as a lower substrate or an array substrate. The gate lines and the data lines cross each other to define pixel regions. A thin film transistor (TFT) is formed at each crossing point of the gate and data lines, and a pixel electrode is connected to the thin film transistor at each pixel region. The pixel electrode may be formed of a transparent conductive material.

In addition, a black matrix and red, green and blue color filter patterns are formed on an inner surface of the second substrate 114, which may be referred to as an upper substrate or a color filter substrate. The color filter patterns correspond to the pixel regions, respectively. The black matrix surrounds each of the color filter patterns and covers the gate lines, the data lines, and the thin film transistors. A transparent common electrode is formed over the color filter patterns and the black matrix.

Polarizers (not shown) are attached to outer surfaces of the first and second substrates 112 and 114 and selectively transmit linearly polarized light.

A printed circuit board 117 is attached to at least a side of each of the first and second liquid crystal panels 110a and 110b via connecting means 116 such as flexible printed circuit boards or tape carrier packages (TCPs), for example.

In each of the first and second liquid crystal panels 110a and 110b, on/off signals from gate driving circuits are provided to the thin film transistors through the gate lines, and when the thin film transistors selected by each gate line turn on, data signals from data driving circuits are provided to the pixel electrodes through the data line. Accordingly, an electric field is induced between the pixel electrodes and the common electrode, and the arrangement of the liquid crystal molecules is changed by the electric field to thereby change transmittance of light. Therefore, each of the liquid crystal panels 110a and 110b displays images depending on variances in the transmittance.

The backlight unit 120 is disposed between the first and second liquid crystal panels 110a and 110b and provides light to the first and second liquid crystal panels 110a and 110b so that the variances in the transmittance of each of the first and second liquid crystal panels 110a and 110b are shown to the outside.

The backlight unit 120 includes a light-emitting diode (LED) assembly 129, a light guide plate 200, and first and second optical sheets 121a and 121b.

The first optical sheets 121a are disposed at a rear side of the first liquid crystal panel 110a, and the second optical sheets 121b are disposed at a rear side of the second liquid crystal panel 110b. The light guide plate 200 is disposed between the first optical sheets 121a and the second optical sheets 121b. The LED assembly 129 is disposed at a side surface of the light guide plate 200 such that the LED assembly 129 faces the side surface of the light guide plate 200, which light is incident on.

The LED assembly 129 includes a plurality of LEDs 129a and a printed circuit board (PCB) 129b on which the LEDs 129a are mounted and spaced apart from each other.

The LEDs 129a include red (R), green (G) and blue (B) LEDs respectively emitting red, green and blue light toward the side surface of the light guide plate 200. A white light is produced by lighting the RGB LEDs 129a up at a time and by mixing the red, green and blue light. Alternatively, each of the LEDs 129a may include an LED chip emitting red, green and blue light, and each LED 129a may produce a white light. The LED 129a may include a chip emitting a white light and emit a full white light.

Here, a fluorescent lamp such as a cold cathode fluorescent lamp or an external electrode fluorescent lam may be used instead of the LED assembly 129. When the fluorescent lamp is used as a light source, a lamp guide is needed to cover and protect outer sides of the fluorescent lamp and to concentrate light.

Light emitted from the LEDs 129a of the LED assembly 129 is incident on an inside of the light guide plate 200, and the light guide plate 200 totally reflects the light several times such that the light moves through the inside of the light guide plate 200 and is uniformly scattered. The light guide plate 200 repeats reflecting and transmitting, and a plane light source is provided to the first and second liquid crystal panels 110a and 110b.

To provide a uniform plane light source to the first and second liquid crystal panels 110a and 110b, the light guide plate 200 may include predetermined patterns 210a and 210b at its upper and lower surfaces, respectively.

To guide the light incident on the inside of the light guide plate 200, the patterns 210a and 210b may be elliptical patterns, polygonal patterns or hologram patterns. The patterns 210a and 210b may be formed by a printing method or an injecting method.

Accordingly, even though the edge-type backlight unit 120 of light weight and thin thickness is included, the prevent invention can provide a two-way LCD device that displays images in both directions.

Specially, since the backlight unit 120 provides light to both the first and second liquid crystal panels 110a and 110b, the two-way LCD device can achieve relatively light weight and thin thickness. Thus, processes are simplified, and it is easy to modularize. Moreover, the manufacturing costs of the two-way LCD device can be decreased. This will be described in more detail later.

The first and second optical sheets 121a and 121b, which are disposed between the light guide plate 200 and the first liquid crystal panel 110a and between the light guide plate 200 and the second liquid crystal panel 110b, respectively, include a diffuser sheet and at least a light-concentrating sheet. The first and second optical sheets 121a and 121b diffuse or concentrate light passing through the light guide plate 200 such that more uniform plane light source is provided to the first and second liquid crystal panels 110a and 110b.

The first and second liquid crystal panels 110a and 110b and the backlight unit 120 are modularized with the first and second top covers 140a and 140b and the support main 130. The first and second top covers 140a and 140b have a rectangular frame shape with an L-shaped cross-section to cover edges of front surfaces and side surfaces of the first and second liquid crystal panels 110a and 110b, respectively. A front surface of each of the first and second top covers 140a and 140b has an opening, wherein images of each of the first and second liquid crystal panels 110a and 110b are displayed through the opening. The first and second top covers 140a and 140b are combined with the support main 130.

The support main 130 has a rectangular frame shape and surrounds sides of the first and second liquid crystal panels 110a and 110b and the backlight unit 120. The support main 130 includes a first part 130a and a second part 130b each having a vertical portion 131 of FIG. 3. The first part 130a surrounds the sides of the first liquid crystal panel 110a, and the second part 130b surrounds the sides of the second liquid crystal panel 110b and the backlight unit 120.

The two-way LCD device is more easily modularized due to the support main 130 including the first and second parts 130a and 130b. This will be explained in more detail later.

The top cover 140a and 140b may be referred to as a case top or a top case, and the support main 130 may be referred to as a guide panel, a main support or a mold frame.

As stated above, in the two-way LCD device of the present invention, the edge-type backlight unit 120 is used for a plane light source, and it is possible to provide the two-way LCD device having light weight and thin thickness.

Moreover, the edge-type backlight unit 120 provides the plane light source to both the first and second liquid crystal panels 110a and 110b, and there are more effects of the light weight and thin thickness of the two-way LCD device. In addition, the support main 130 is divided into the first and second parts 130a and 130b to surround the first and second liquid crystal panels 110a and 110b, respectively. Thus, the manufacturing processes are simplified, and modularizing is easy.

Furthermore, the manufacturing costs are decreased.

Figure 3:
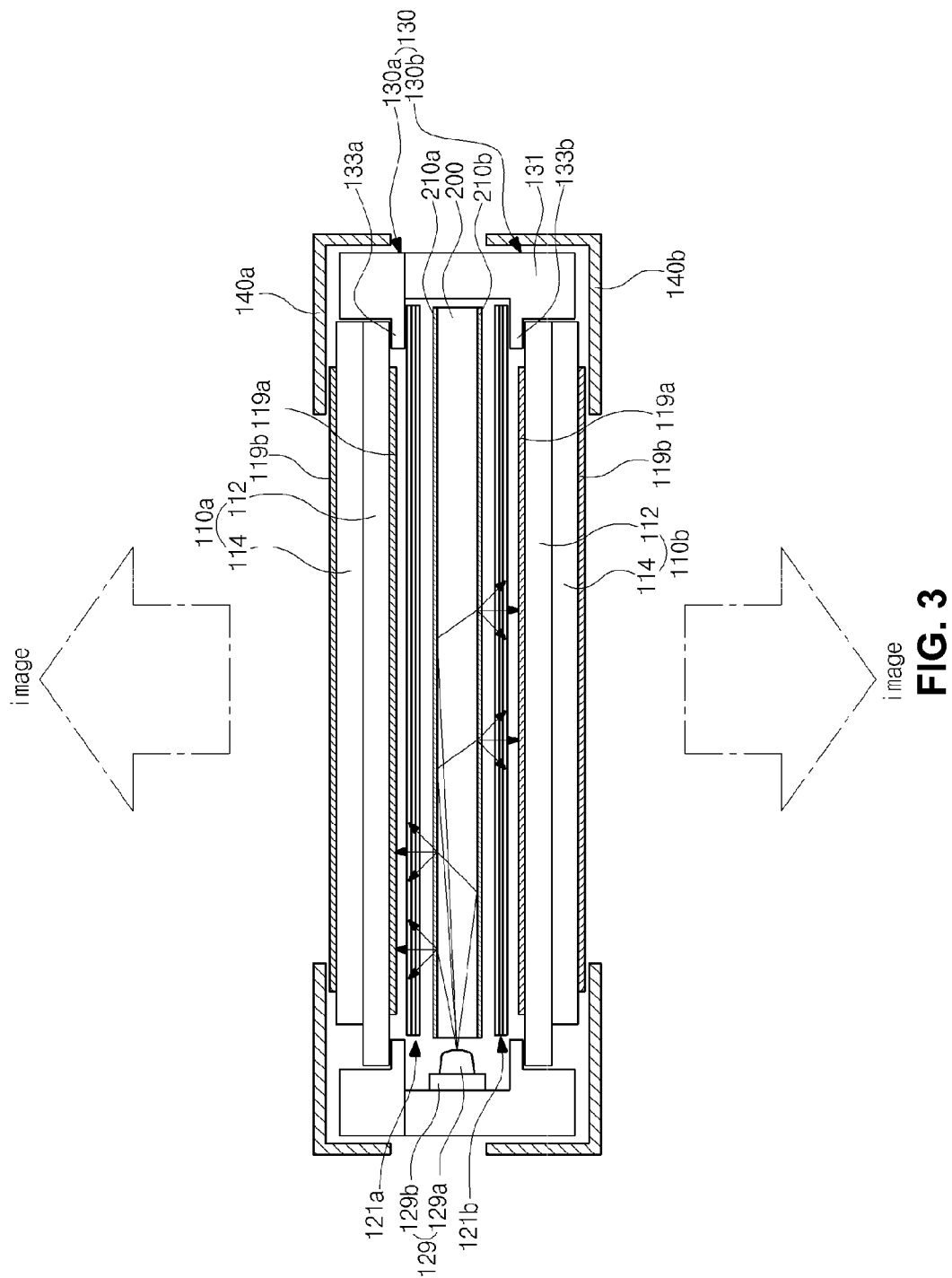
FIG. 3 is a cross-sectional view of schematically illustrating the modularized two-way LCD device of FIG. 2.

FIG. 3 is a cross-sectional view of schematically illustrating the modularized two-way LCD device of FIG. 2.

In FIG. 3, the first and second liquid crystal panels 110a and 110b are overlapped at upper and lower sides of the backlight unit 120 of FIG. 2. The support main 130 surrounds the sides of the first and second liquid crystal panels 110a and 110b and the backlight unit 120 of FIG. 2. The first and second top covers 140a and 140b cover edges of front surfaces and side surfaces of the first and second liquid crystal panels 110a and 110b, respectively. The first and second top covers 140a and 140b are combined with the support main 130 to modularize the first and second liquid crystal panels 110a and 110b and the backlight unit 120 of FIG. 2.

Here, unexplained reference numbers 119a and 119b represent polarizers which are attach at front and rear surfaces of each of the first and second liquid crystal panels 110a and 110b, respectively, and control the polarization of light.

The backlight unit 120 of FIG. 2 includes the light guide plate 200, the LED assembly 129 at the side surface of the light guide plate 200, and the first and second optical sheets 121a and 121b at upper and lower surfaces of the light guide plate 200, respectively.

More particularly, the LED assembly may be disposed at an inner side surface of the vertical portion 131 of the second part 130b along a length direction of the support main 130 and may be fixed by an adhesive material (not shown) such as double-sided tape. A surface of the LED 129a, through which light is emitted, faces the side surface of the light guide plate 200, on which light is incident.

The light guide plate 200 guides light emitted from the LED assembly 129 into the first and second liquid crystal panels 110a and 110b. The first optical sheets 121a and the first liquid crystal panel 110a are sequentially disposed over the upper surface of the light guide plate 200, and the second optical sheets 121b and the second liquid crystal panel 110b are sequentially disposed over the lower surface of the light guide plate 200.

Here, light emitted from the LEDs 129a of the LED assembly 129 is incident on the inside of the light guide plate 200, and the light guide plate 200 totally reflects the light several times such that the light moves through the inside of the light guide plate 200 and is uniformly scattered.

When the light incident on the inside of the light guide plate 200 is totally reflected in the inside of the light guide plate 200 several times, some of the light is totally reflected due to the patterns 210a and 210b at the upper and lower surfaces of the light guide plate 200, and other of the light is transmitted through the light guide plate 200. The transmitted light is propagated to the first and second optical sheets 121a and 121b.

The light propagated to the first and second optical sheets 121a and 121b is changed to have uniform brightness and high qualities while passing through the first and second optical sheets 121a and 121b and then is provided to the first and second liquid crystal panels 110a and 110b. Therefore, the first and second liquid crystal panels 110a and 110b display images.

Here, the total reflection of the light in the light guide plate 200 is guided by the patterns 210a and 210b, which are formed at the upper and lower surfaces of the light guide plate 200 facing the first and second liquid crystal panels 110a and 110b, respectively. The amount of the light provided to the first and second liquid crystal panels 110a and 110b can be controlled by adjusting shapes, sides and/or densities of the patterns 210a and 210b.

That is, when the density of the patterns 210a at the upper surface of the light guide plate 200 is higher than the density of the patterns 210b at the lower surface of the light guide plate 200, there are more total reflections at the upper surface of the light guide plate 200 than the lower surface of the light guide plate 200.

From this, the amount of the light passing through the upper surface of the light guide plate 200 is decreased. The amount of the light passing through the lower surface of the light guide plate 200 is increased against the amount of the light passing through the upper surface of the light guide plate 200, and light is provided to the second liquid crystal panel 110b more than the first liquid crystal panel 110a.

Accordingly, when the images displayed by the two-way LCD device of the present invention are the same in both directions, the images may have the same brightness or different brightness depending on circumstances or places.

Like this, in the two-way LCD device of the present invention, the edge-type backlight unit 120 of FIG. 2 is used for a plane light source, and it is possible to provide the two-way LCD device having light weight and thin thickness.

Moreover, the edge-type backlight unit 120 of FIG. 2 provides the plane light source to the first and second liquid crystal panels 110a and 110b, and there are more effects of the light weight and thin thickness of the two-way LCD device. Thus, the manufacturing processes are simplified, and modularizing is easy. Furthermore, the manufacturing costs are decreased.

In addition, the support main 130 has a rectangular frame shape and surrounds side surfaces of the first and second liquid crystal panels 110a and 110b and the backlight unit 120 of FIG. 2. The support main 130 is divided into the first and second parts 130a and 130b.

More particularly, the first and second parts 130a and 130b each have the vertical portion 131. The first part 130a surrounds the side surfaces of the first liquid crystal panel 110a, and the second part 130b surrounds the side surfaces of the second liquid crystal panel 110b and the backlight unit 120 of FIG. 2.

The first and second parts 130a and 130b further includes first and second protruding portions 133a and 133b, respectively. The first and second protruding portions 133a and 133b are protruded from inner surfaces of the vertical portions 131 of the first and second parts 130a and 130b, respectively. The first liquid crystal panel 110a is disposed on and supported by the first protruding portion 133a, and the second liquid crystal panel 110b is disposed on and supported by the second protruding portion 133b. The first and second liquid crystal panels 110a and 110b and the backlight unit 120 of FIG. 2 are surrounded by the vertical portions 131.

The backlight unit 120 of FIG. 2 is disposed between the first and second protruding portions 133a and 133b. The LED assembly 129 of the backlight unit 120 of FIG. 2 is fixed at the inner surface of the vertical portion 131 of the second part 130b between the first and second protruding portions 133a and 133b by an adhesive material such as a double-sided tape.

In the present invention, since the support main 130 is divided into the first part 130a having the first protruding portion 133a and the second part 130b having the second protruding portion 133b, it is easy to modularize the first and second liquid crystal panels 110a and 110b and the backlight unit 120 of FIG. 2.

Namely, the second liquid crystal panel 110b is disposed over the second protruding portion 133b of the second part 130b of the support main 130, and the second part 130b of the support main 130 is combined with the second top cover 140b, thereby fixing the second liquid crystal panel 110b. Then, the backlight unit 120 of FIG. 2 is received under the second protruding portion 133b of the second part 130b of the support main 130.

Next, the first part 130a of the support main 130 is combined with the second part 130b, and the first liquid crystal panel 110a is received over the first protruding portion 133a of the first part 130a of the support main 130. The first part 130a of the support main 130 is combined with the first top cover 140a.

Therefore, the first and second liquid crystal panels 110a and 110b and the backlight unit 120 of FIG. 2 can be easily modularized through the main support 130 and the first and second top covers 140a and 140b.

Meanwhile, even though the first top cover 140a is combined with the first part 130a of the support main 130 in the figure, the first top cover 140a may be extended to the second part 130b of the support main 130 and also combined with the second part 130b. Thus, the two-way LCD device may be further firmly modularized.

As stated above, in the two-way LCD device of the present invention, the edge-type backlight unit 120 is used for a plane light source, and it is possible to provide the two-way LCD device having light weight and thin thickness.

Moreover, the edge-type backlight unit 120 provides the plane light source to the first and second liquid crystal panels 110a and 110b, and there are more effects of the light weight and thin thickness of the two-way LCD device. In addition, the manufacturing processes are simplified, and modularizing is easy. Furthermore, the manufacturing costs are decreased.

Since the support main 130 is divided into the first and second parts 130a and 130b to surround the first and second liquid crystal panels 110a and 110b, respectively, modularizing the two-way LCD device is further easy.

In the meantime, the light guide plate 200, as shown in FIG. 2 and FIG. 3, may have the uniform thickness. Alternatively, the light guide plate 200 may have different thicknesses at the side surface on which light is incident and an opposite side surface.

Figure 4A:
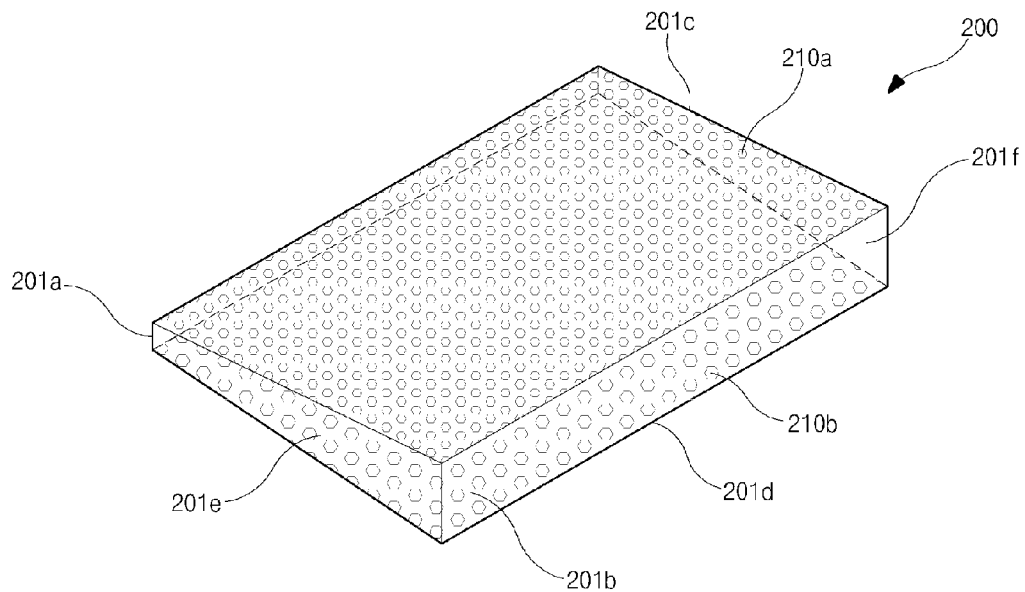
FIG. 4A and FIG. 4B are perspective views of schematically illustrating a light guide plate according to an exemplary embodiment of the present invention.
Figure 4B:
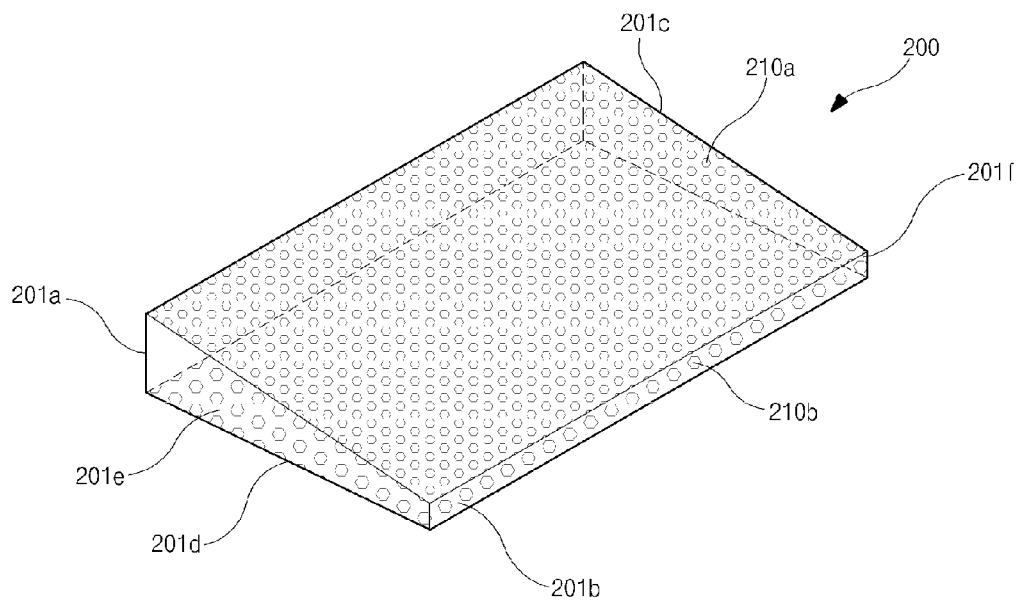

FIG. 4A and FIG. 4B are perspective views of schematically illustrating a light guide plate according to an exemplary embodiment of the present invention.

As shown in the figures, the light guide plate 200 may be a flat type. The light guide plate 200 may include a plastic material of transparent acrylate resin such as polymethylmethacrylate (PMMA), or the light guide plate 200 may include polycarbonate (PC). Here, since PMMA is excellent in transparency, weatherproof, and colorability, PMMA causes diffusion of light when the light passes through.

The light guide plate 200 includes first, second, third, fourth, fifth and sixth surfaces 201a, 201b, 201c, 201d, 201e and 201f. The first surface 201a corresponds to the LED assembly 129 of FIG. 3, and light from the LED assembly 129 of FIG. 3 is incident on the first surface 201a. The second surface 201b is opposite to the first surface 201a. The fifth and sixth surfaces 201e and 201f are opposite to each other and adjacent to the first and second surfaces 201a and 201b. The third and fourth surfaces 201c and 201d correspond to upper and lower surfaces of the light guide plate 200 and connect the first, second, fifth and sixth surfaces 201a, 201b, 201e and 201f. The light incident on the first surface 201a is transmitted through the third and fourth surfaces 201c and 201d.

Patterns 210a and 201b are formed at the third and fourth surfaces 201c and 201d to guide the light in both directions.

In FIG. 4A, the thickness of the light guide plate 200 is increased from the first surface 201a to the second surface 201b. That is, the thickness of the light guide plate 200 corresponding to the second surface 201b is thicker than the thickness of the light guide plate 200 corresponding to the first surface 201a.

On the other hand, in FIG. 4B, the thickness of the light guide plate 200 is decreased from the first surface 201a to the second surface 201b. Namely, the thickness of the light guide plate 200 corresponding to the second surface 201b is thinner than the thickness of the light guide plate 200 corresponding to the first surface 201a.

Since the light guide plate 200 has different thicknesses corresponding to the first and second surfaces 201a and 201b, the two-way LCD device also may have different thicknesses corresponding to the first and second surfaces 201a and 201b.

Therefore, to use the two-way LCD device as a monitor for a personal computer, the two-way LCD device may be manufactured to be matched with the viewing angles of the viewer depending on positions of the device that is used upright.

Figure 5A:
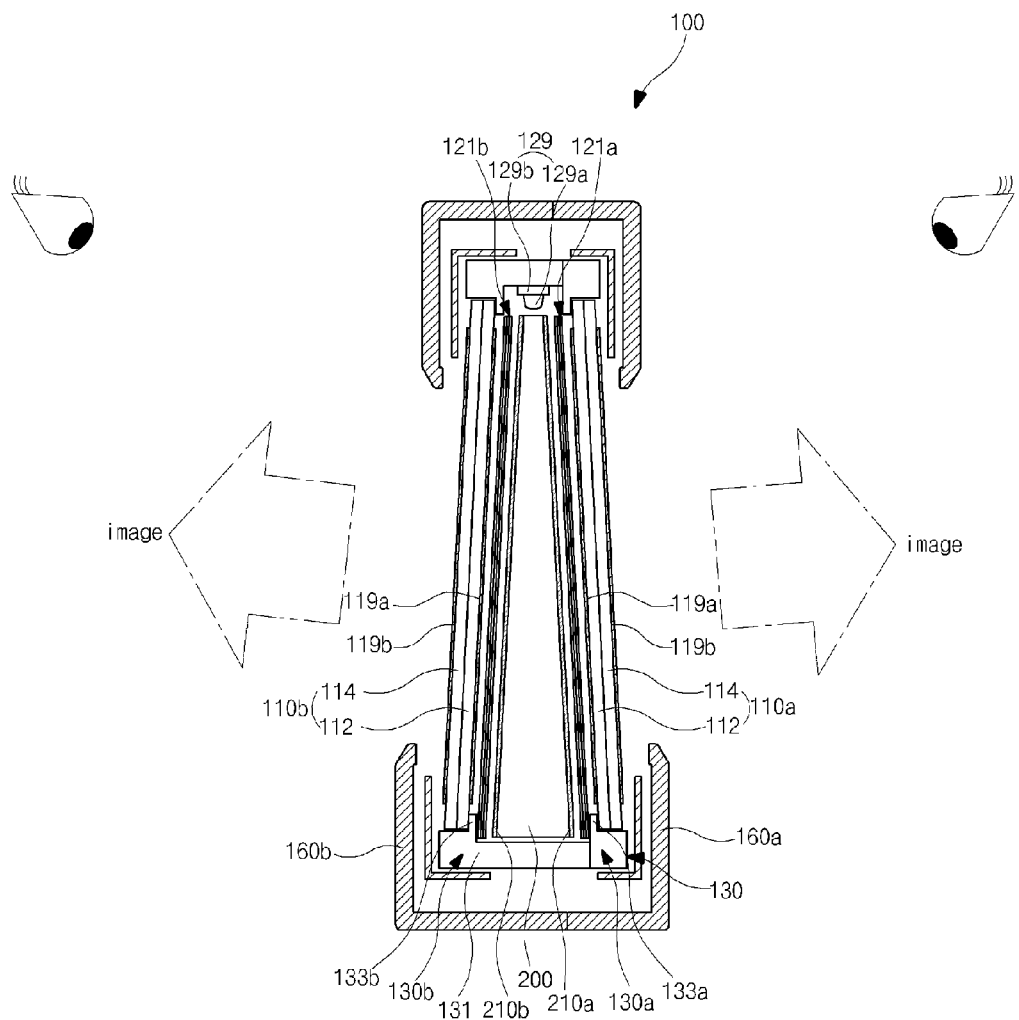
FIG. 5A and FIG. 5B are cross-sectional views of schematically illustrating a display device that includes a two-way LCD device having a light guide plate according to the exemplary embodiment of the present invention.
Figure 5B:
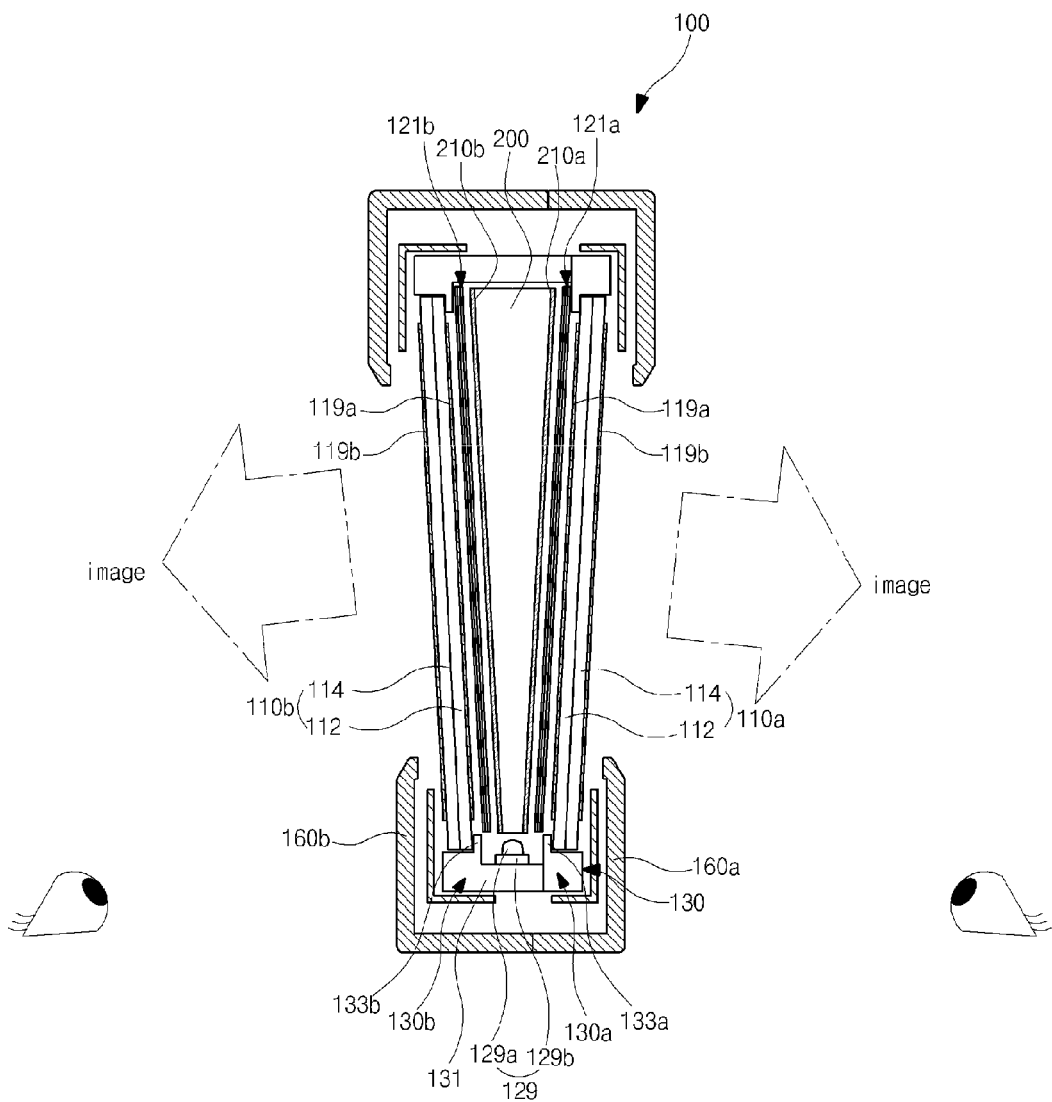

FIG. 5A and FIG. 5B are cross-sectional views of schematically illustrating a display device that includes a two-way LCD device having a light guide plate according to the exemplary embodiment of the present invention. For example, the two-way LCD device of FIG. 5A and FIG. 5B may include the light guide plate of FIG. 4A.

In FIG. 5A, first and second front covers 160a and 160b cover edges of both displaying surfaces of the two-way LCD device and are combined with each other to form one-united body. The first and second front covers 160a and 160b and the two-way LCD device constitute the display device 100.

Here, the two-way LCD device includes a backlight unit 120 of FIG. 2 comprising a light guide plate 200, an LED assembly 129 at a side surface of the light guide plate 200 and first and second optical sheets 121a and 121b over upper and lower surfaces of the light guide plate 200, substantially over right and left surfaces of the light guide plate 200 in the context of the figure. The two-way LCD device further includes first and second liquid crystal panels 110a and 110b over and under the backlight unit 120 of FIG. 2, substantially at right and left sides of the backlight unit 120 of FIG. 2 in the context of the figure. Each of the first and second liquid crystal panels 110a and 110b includes first and second substrates 112 and 114 and a liquid crystal layer (not shown) therebetween.

Polarizers 119a and 119b are attached to front and rear surfaces of each of the first and second liquid crystal panels 110a and 110b.

Sides of the backlight unit 120 of FIG. 2 and the first and second liquid crystal panels 110a and 110b are surrounded by a support main 130. The first and second liquid crystal panels 110a and 110b and the backlight unit 120 of FIG. 2 are modularized with the first and second top covers 140a and 140b and the support main 130.

Here, the light guide plate 200 has a thickness increasing from a first surface 201a of FIG. 4B, which light is incident on and corresponds to an LED 129a mounted on a PCB 129b of the LED assembly, to a second surface 201b of FIG. 4B, which is opposite to the first surface 201a of FIG. 4B.

When the display device 100 is used upright, the second surface 201b of FIG. 4B of the light guide plate 200 is disposed down in the context of the figure. Thus, the display device 100 is implemented such that the front viewing angle normal to the displaying surfaces of the two-way LCD device faces upward.

Even though the display device 100 is placed under an eye-level of the viewer, the viewer does not need to lower the eye-level.

On the contrary, in FIG. 5B, when the display device 100 is placed over the eye-level of the viewer, the display device 100 may be implemented such that the second surface 201b of FIG. 4A of the light guide plate 200 thicker than the first surface 201a of FIG. 4A is disposed up in the context of the figure and the front viewing angle faces downward.

In the present invention, the light guide plate 200 of the two-way LCD device has different thicknesses at the first and second surfaces 201a and 201b of FIG. 4A, and the display device 100 can be placed upright depending on the eye-level of the viewer when the two-way LCD device is used for the display device 100 such as a monitor for a personal computer.

In addition, as stated above, in the two-way LCD device according to the first embodiment of the present invention, the edge-type backlight unit 120 of FIG. 2 is used for a plane light source, and it is possible to provide the two-way LCD device having light weight and thin thickness.

Moreover, the edge-type backlight unit 120 of FIG. 2 provides the plane light source to the first and second liquid crystal panels 110a and 110b, and there are more effects on the light weight and thin thickness of the two-way LCD device. The manufacturing costs of the two-way LCD device also can be decreased.

Furthermore, the support main 130 is divided into the first and second parts 130a and 130b to surround the first and second liquid crystal panels 110a and 110b, respectively. Thus, it is further easy to modularize the two-way LCD device.

Since the light guide plate 200 have different thicknesses at the first surface 201a of FIG. 4A corresponding to the LED assembly 129 and the second surfaces 201b of FIG. 4A opposite to the first surface 201a of FIG. 4A, the two-way LCD device has non-uniform thickness. The display device 100 can be placed upright depending on the eye-level of the viewer when the two-way LCD device is used for the display device 100 such as a monitor for a personal computer.

Here, the backlight unit 120 of FIG. 2 having the above-mentioned structure may be referred to as a sidelight type. A plurality of LED assemblies 129 may be arranged at inner surfaces of the support main 130 facing each other along a length direction thereof, and more than one LED assemblies 129 may be disposed at each of the inner surfaces of the support main 130.

Meanwhile, the light guide plate of FIG. 4B may be used for the two-way LCD device of FIG. 5A and FIG. 5B instead of the light guide plate of FIG. 4A.

Figure 6:
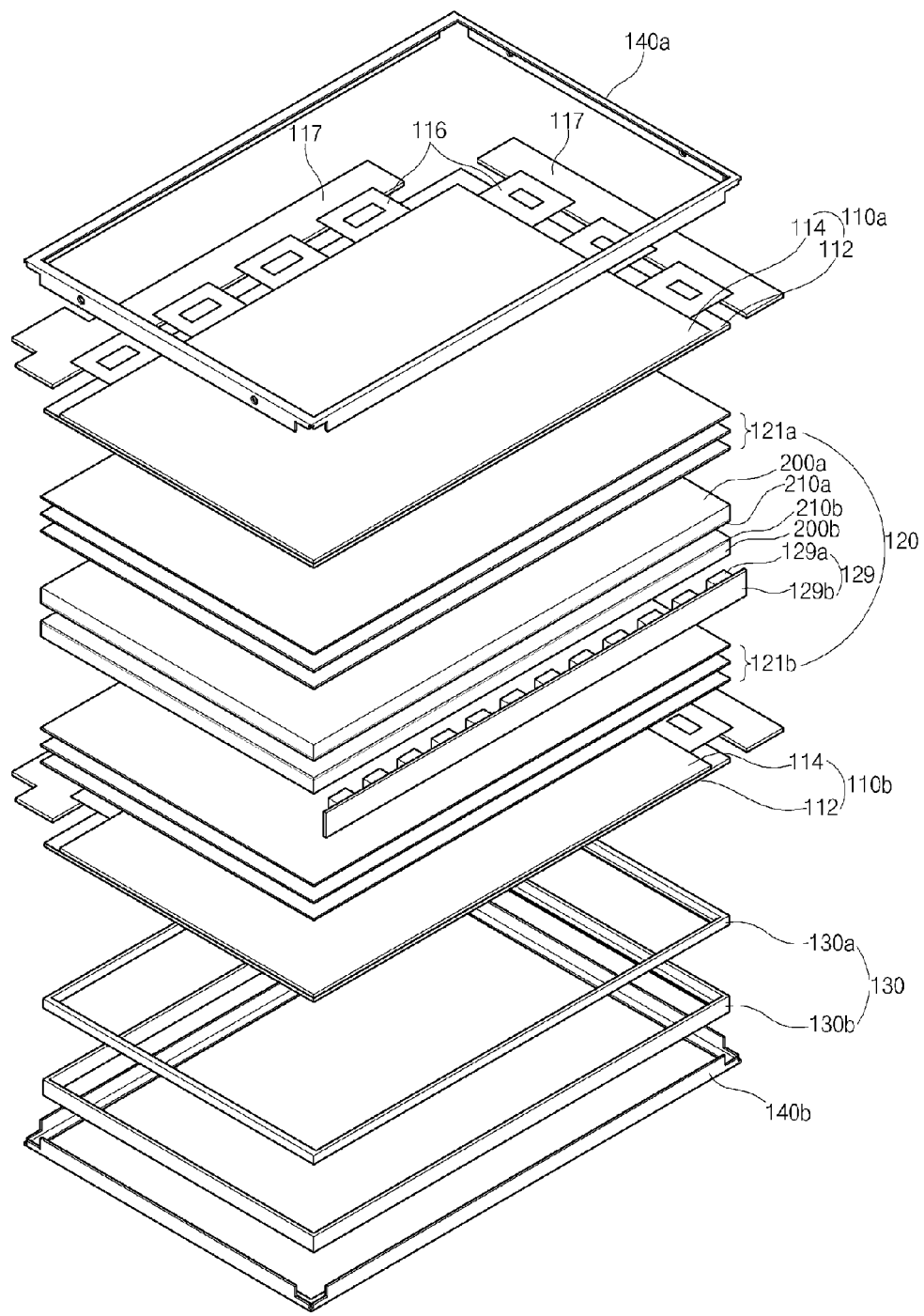
FIG. 6 is an exploded perspective view of illustrating a two-way LCD device according to a second embodiment of the present invention.

FIG. 6 is an exploded perspective view of illustrating a two-way LCD device according to a second embodiment of the present invention.

In the second embodiment, the same parts as the first embodiment may be designated by the same references, and explanations for the same parts may be omitted or simplified.

In FIG. 6, a two-way LCD device according to the second embodiment of the present invention includes first and second liquid crystal panels 110a and 110b, a backlight unit 120, a support main 130, and first and second top covers 140a and 140b.

More particularly, the first and second liquid crystal panels 110a and 110b display images. Each of the first and second liquid crystal panels 110a and 110b includes first and second substrates 112 and 114 facing and attached to each other with a liquid crystal layer interposed therebetween.

A printed circuit board 117 is attached to at least a side of each of the first and second liquid crystal panels 110a and 110b via connecting means 116 such as flexible printed circuit boards or tape carrier packages (TCPs), for example.

The backlight unit 120 is disposed between the first and second liquid crystal panels 110a and 110b and provides light to the first and second liquid crystal panels 110a and 110b so that the variances in the transmittance of each of the first and second liquid crystal panels 110a and 110b are shown to the outside.

The backlight unit 120 includes a light-emitting diode (LED) assembly 129, first and second light guide plates 200a and 200b, and first and second optical sheets 121a and 121b.

That is, the first optical sheets 121a and the first light guide plate 200a are disposed at a rear side of the first liquid crystal panel 110a, and the second optical sheets 121b and the second light guide plate 200b are disposed at a rear side of the second liquid crystal panel 110b. The LED assembly 129 is disposed at side surfaces of the first and second light guide plates 200a and 200b such that the LED assembly 129 faces the side surfaces of the first and second light guide plates 200a and 200b, which light is incident on.

The LED assembly 129 includes a plurality of LEDs 129a and a printed circuit board (PCB) 129b on which the LEDs 129a are mounted and spaced apart from each other.

Light emitted from the LEDs 129a of the LED assembly 129 is incident on insides of the first and second light guide plates 200a and 200b, and the first and second light guide plates 200a and 200b totally reflect the light several times such that the light moves through the insides of the first and second light guide plates 200a and 200b.

At this time, the light incident on the inside of the first light guide plate 200a moves through the inside of the first light guide plate 200a and is uniformly scattered, thereby being provided to the first liquid crystal panel 110a. The light incident on the inside of the second light guide plate 200b moves through the inside of the second light guide plate 200b and is uniformly scattered, thereby being provided to the second liquid crystal panel 110b.

When outer surfaces of the first and second light guide plates 200a and 200b, through which the light is provided to the first and second liquid crystal panels 110a and 110b, respectively, are defined as upper surfaces thereof, to provide a uniform plane light source to the first and second liquid crystal panels 110a and 110b, the first and second liquid crystal panels 110a and 110b may have predetermined patterns 210a and 210b at respective lower surfaces of, which face each other and are opposite to the upper surfaces of the first and second light guide plates 200a and 200b.

Thus, the backlight unit 120 can provide the plane light source to the first and second liquid crystal panels 110a and 110b at the same time.

To guide the light incident on the insides of the first and second light guide plates 200a and 200b, the patterns 210a and 210b may be elliptical patterns, polygonal patterns or hologram patterns. The patterns 210a and 210b may be formed by a printing method or an injecting method.

Accordingly, even though the edge-type backlight unit 120 of light weight and thin thickness is included, the prevent invention can provide a two-way LCD device that displays images in both directions.

Specially, since the backlight unit 120 provides light to both the first and second liquid crystal panels 110a and 110b, the two-way LCD device can achieve relatively light weight and thin thickness. Thus, processes are simplified, and it is easy to modularize. Moreover, the manufacturing costs of the two-way LCD device can be decreased. This will be described in more detail later.

The first and second optical sheets 121a and 121b, which are disposed between the first light guide plate 200a and the first liquid crystal panel 110a and between the second light guide plate 200a and the second liquid crystal panel 110b, respectively, include a diffuser sheet and at least a light-concentrating sheet. The first and second optical sheets 121a and 121b diffuse or concentrate light passing through the first and second light guide plates 200a and 200b such that more uniform plane light source is provided to the first and second liquid crystal panels 110a and 110b.

The first and second liquid crystal panels 110a and 110b and the backlight unit 120 are modularized with the first and second top covers 140a and 140b and the support main 130. The first and second top covers 140a and 140b have a rectangular frame shape with an L-shaped cross-section to cover edges of front surfaces and side surfaces of the first and second liquid crystal panels 110a and 110b, respectively. A front surface of each of the first and second top covers 140a and 140b has an opening, wherein images of each of the first and second liquid crystal panels 110a and 110b are displayed through the opening. The first and second top covers 140a and 140b are combined with the support main 130.

The support main 130 has a rectangular frame shape and surrounds sides of the first and second liquid crystal panels 110a and 110b and the backlight unit 120. The support main 130 includes a first part 130a and a second part 130b each having a vertical portion 131 of FIG. 7. The first part 130a surrounds the sides of the first liquid crystal panel 110a, and the second part 130b surrounds the sides of the second liquid crystal panel 110b and the backlight unit 120.

The two-way LCD device is more easily modularized due to the support main 130 including the first and second parts 130a and 130b As stated above, in the two-way LCD device of the present invention, the edge-type backlight unit 120 is used for a plane light source, and it is possible to provide the two-way LCD device having light weight and thin thickness.

Moreover, the edge-type backlight unit 120 provides the plane light source to both the first and second liquid crystal panels 110a and 110b, and there are more effects of the light weight and thin thickness of the two-way LCD device. Thus, the manufacturing processes are simplified, and modularizing is easy.

Furthermore, the manufacturing costs are decreased.

In addition, the support main 130 is divided into the first and second parts 130a and 130b to surround the first and second liquid crystal panels 110a and 110b, respectively. It is further easy to modularize the two-way LCD device.

Figure 7:
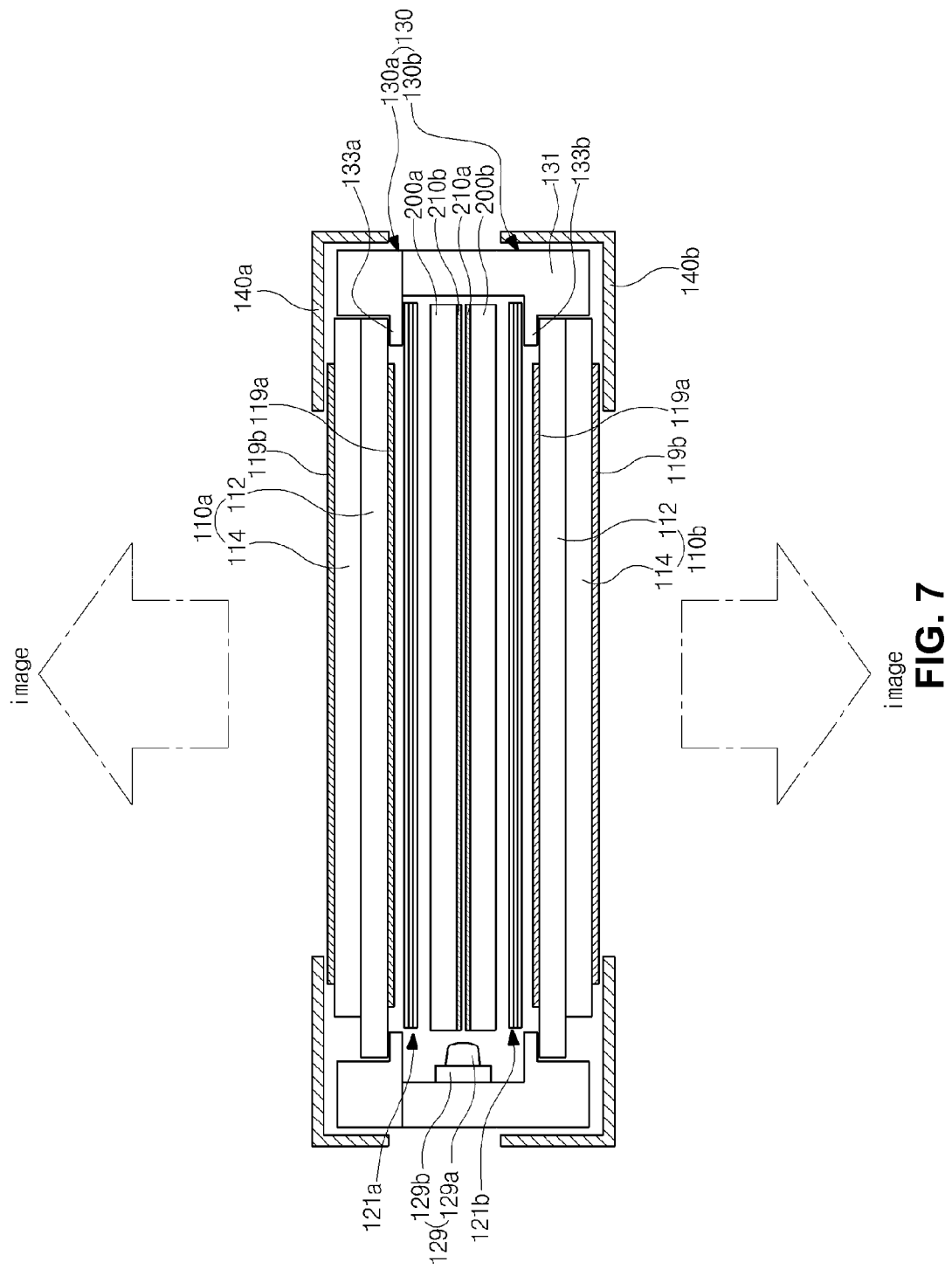
FIG. 7 is a cross-sectional view of schematically illustrating the modularized two-way LCD device of FIG. 6.

FIG. 7 is a cross-sectional view of schematically illustrating the modularized two-way LCD device of FIG. 6.

In FIG. 7, the first and second liquid crystal panels 110a and 110b are overlapped at upper and lower sides of the backlight unit 120 of FIG. 6. The support main 130 surrounds the sides of the first and second liquid crystal panels 110a and 110b and the backlight unit 120 of FIG. 6. The first and second top covers 140a and 140b cover edges of front surfaces and side surfaces of the first and second liquid crystal panels 110a and 110b, respectively. The first and second top covers 140a and 140b are combined with the support main 130 to modularize the first and second liquid crystal panels 110a and 110b and the backlight unit 120 of FIG. 6 as one-united body.

Here, unexplained reference numbers 119a and 119b represent polarizers which are attach at front and rear surfaces of each of the first and second liquid crystal panels 110a and 110b, respectively, and control the polarization of light.

The backlight unit 120 of FIG. 6 includes the first and second light guide plates 200a and 200b, the LED assembly 129 at the side surfaces of the first and second light guide plates 200a and 200b, and the first and second optical sheets 121a and 121b at the upper surfaces of the first and second light guide plates 200a and 200b, respectively.

More particularly, the LED assembly may be disposed at an inner side surface of the vertical portion 131 of the second part 130b along a length direction of the support main 130 and may be fixed by an adhesive material (not shown) such as double-sided tape. A surface of the LED 129a, through which light is emitted, faces the side surfaces of the first and second light guide plates 200a and 200b, on which light is incident.

The first and second light guide plates 200a and 200b guide light emitted from the LED assembly 129 into the first and second liquid crystal panels 110a and 110b, respectively. The first optical sheets 121a and the first liquid crystal panel 110a are sequentially disposed over the upper surface of the first light guide plate 200a, and the second optical sheets 121b and the second liquid crystal panel 110b are sequentially disposed over the upper surface of the second light guide plate 200b.

Here, light emitted from the LEDs 129a of the LED assembly 129 is incident on the insides of the first and second light guide plates 200a and 200b, and the first and second light guide plates 200a and 200b totally reflect the light several times such that the light moves through the insides of the first and second light guide plates 200a and 200b and is uniformly scattered.

When the light incident on the inside of the first and second light guide plates 200a and 200b is totally reflected in the insides of the first and second light guide plates 200a and 200b several times, some of the light is totally reflected due to the patterns 210a and 210b at the lower surfaces of the first and second light guide plates 200a and 200b, and other of the light is transmitted through the first and second light guide plates 200a and 200b. The transmitted light is propagated to the first and second optical sheets 121a and 121b.

The light propagated to the first and second optical sheets 121a and 121b is changed to have uniform brightness and high qualities while passing through the first and second optical sheets 121a and 121b and then is provided to the first and second liquid crystal panels 110a and 110b. Therefore, the first and second liquid crystal panels 110a and 110b display images.

Here, the total reflection of the light in the first and second light guide plates 200 is guided by the patterns 210a and 210b, which are formed at the lower surfaces of the first and second light guide plates 200a and 200b facing and adjacent to each other. The amount of the light provided to the first and second liquid crystal panels 110a and 110b can be controlled by adjusting shapes, sides and/or densities of the patterns 210a and 210b.

That is, when the density of the patterns 210a at the lower surface of the first light guide plate 200a is higher than the density of the patterns 210b at the lower surface of the second light guide plate 200b, there are more total reflections of the light incident on the first light guide plate 200a than the second light guide plate 200b.

From this, the amount of the light passing through the first light guide plate 200a is decreased as compared to the amount of the light passing through the second light guide plate 200b. The amount of the light passing through the second light guide plate 200b and being provided to the second liquid crystal panel 110b is more than the amount of the light passing through the first light guide plate 200a and being provided to the first liquid crystal panel 110a.

Accordingly, when the images displayed by the two-way LCD device of the present invention are the same in both directions, the images may have the same brightness or different brightness depending on circumstances or places.

Like this, in the two-way LCD device of the present invention, the edge-type backlight unit 120 of FIG. 6 is used for a plane light source, and it is possible to provide the two-way LCD device having light weight and thin thickness.

Moreover, the edge-type backlight unit 120 of FIG. 6 provides the plane light source to both the first and second liquid crystal panels 110a and 110b, and there are more effects of the light weight and thin thickness of the two-way LCD device. Thus, the manufacturing processes are simplified, and modularizing is easy. Furthermore, the manufacturing costs are decreased.

In addition, the support main 130 has a rectangular frame shape and surrounds side surfaces of the first and second liquid crystal panels 110a and 110b and the backlight unit 120 of FIG. 6. The support main 130 is divided into the first and second parts 130a and 130b.

More particularly, the first and second parts 130a and 130b each have the vertical portion 131. The first part 130a surrounds the side surfaces of the first liquid crystal panel 110a, and the second part 130b surrounds the side surfaces of the second liquid crystal panel 110b and the backlight unit 120 of FIG. 6.

The first and second parts 130a and 130b further includes first and second protruding portions 133a and 133b, respectively. The first and second protruding portions 133a and 133b are protruded from inner surfaces of the vertical portions 131 of the first and second parts 130a and 130b, respectively. The first liquid crystal panel 110a is disposed on and supported by the first protruding portion 133a, and the second liquid crystal panel 110b is disposed on and supported by the second protruding portion 133b. The first and second liquid crystal panels 110a and 110b and the backlight unit 120 of FIG. 6 are surrounded by the vertical portions 131.

The backlight unit 120 of FIG. 6 is disposed between the first and second protruding portions 133a and 133b. The LED assembly 129 of the backlight unit 120 of FIG. 6 is fixed at the inner surface of the vertical portion 131 of the second part 130b between the first and second protruding portions 133a and 133b by an adhesive material such as a double-sided tape.

In the present invention, since the support main 130 is divided into the first part 130a having the first protruding portion 133a and the second part 130b having the second protruding portion 133b, it is easy to modularize the first and second liquid crystal panels 110a and 110b and the backlight unit 120 of FIG. 6.

Namely, the second liquid crystal panel 110b is disposed over the second protruding portion 133b of the second part 130b of the support main 130, and the second part 130b of the support main 130 is combined with the second top cover 140b, thereby fixing the second liquid crystal panel 110b. Then, the backlight unit 120 of FIG. 6 is received under the second protruding portion 133b of the second part 130b of the support main 130.

Next, the first part 130a of the support main 130 is combined with the second part 130b, and the first liquid crystal panel 110a is received over the first protruding portion 133a of the first part 130a of the support main 130. The first part 130a of the support main 130 is combined with the first top cover 140a.

Therefore, the first and second liquid crystal panels 110a and 110b and the backlight unit 120 of FIG. 6 can be easily modularized through the main support 130 and the first and second top covers 140a and 140b.

As stated above, in the two-way LCD device of the present invention, the edge-type backlight unit 120 of FIG. 6 is used for a plane light source, and it is possible to provide the two-way LCD device having light weight and thin thickness.

Moreover, the edge-type backlight unit 120 of FIG. 6 provides the plane light source to both the first and second liquid crystal panels 110a and 110b, and there are more effects of the light weight and thin thickness of the two-way LCD device. In addition, the manufacturing processes are simplified, and modularizing is easy. Furthermore, the manufacturing costs are decreased.

Since the support main 130 is divided into the first and second parts 130a and 130b to surround the first and second liquid crystal panels 110a and 110b, respectively, modularizing the two-way LCD device is further easy.

In the meantime, the first and second light guide plates 200a and 200b, as shown in FIG. 6 and FIG. 7, may have uniform thicknesses. Alternatively, the first and second light guide plates 200a and 200b may have non-uniform thicknesses.

That is, the first and second light guide plates 200a and 200b may have different thicknesses at the side surface on which light is incident and an opposite side surface. Therefore, a display device can be placed upright depending on the eye-level of the viewer when the two-way LCD device is used for the display device such as a monitor for a personal computer.

Figure 8A:
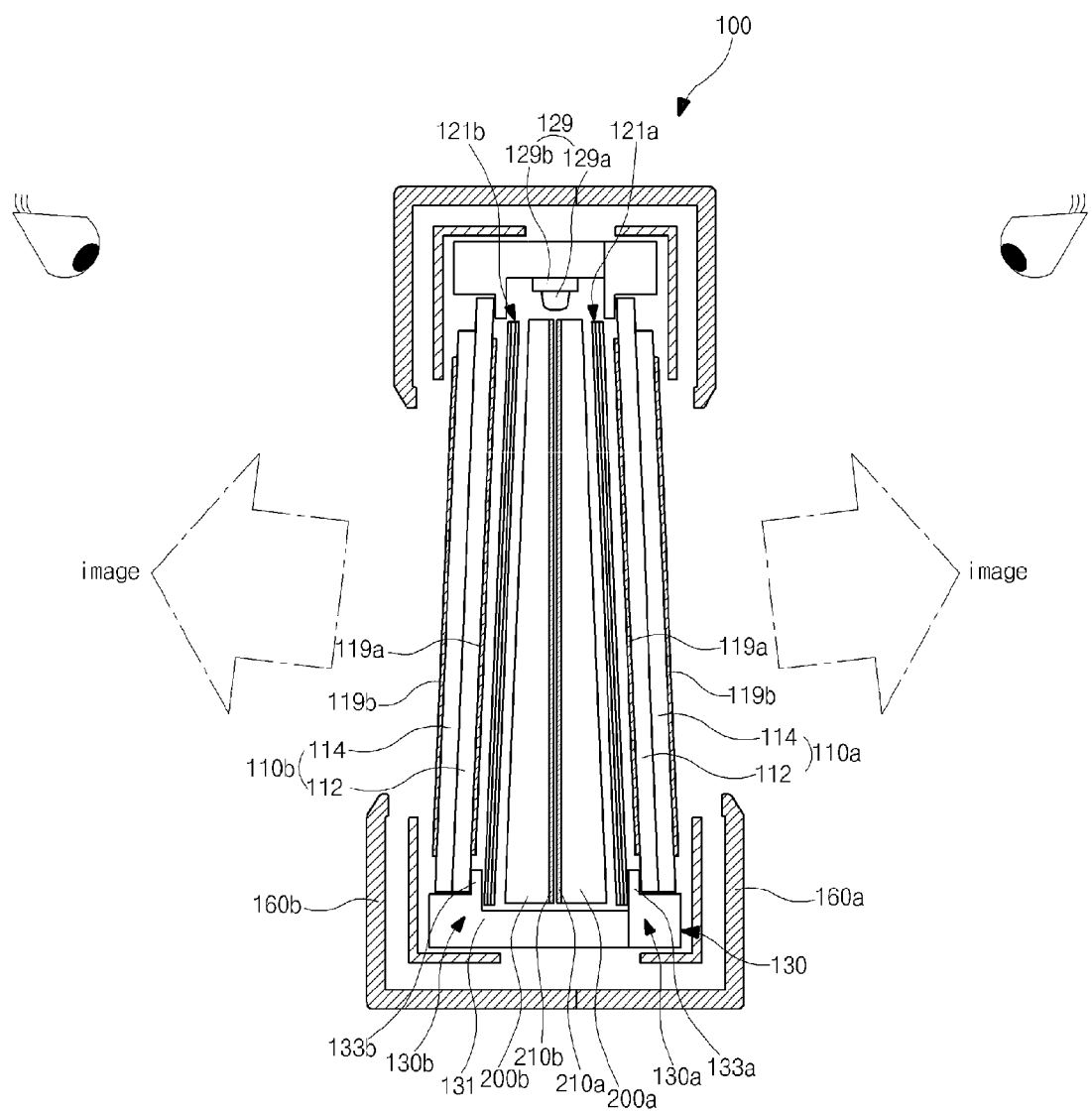
FIG. 8A and FIG. 8B are cross-sectional views of schematically illustrating a display device that includes a two-way LCD device having a light guide plate according to another exemplary embodiment of the present invention.
Figure 8B:
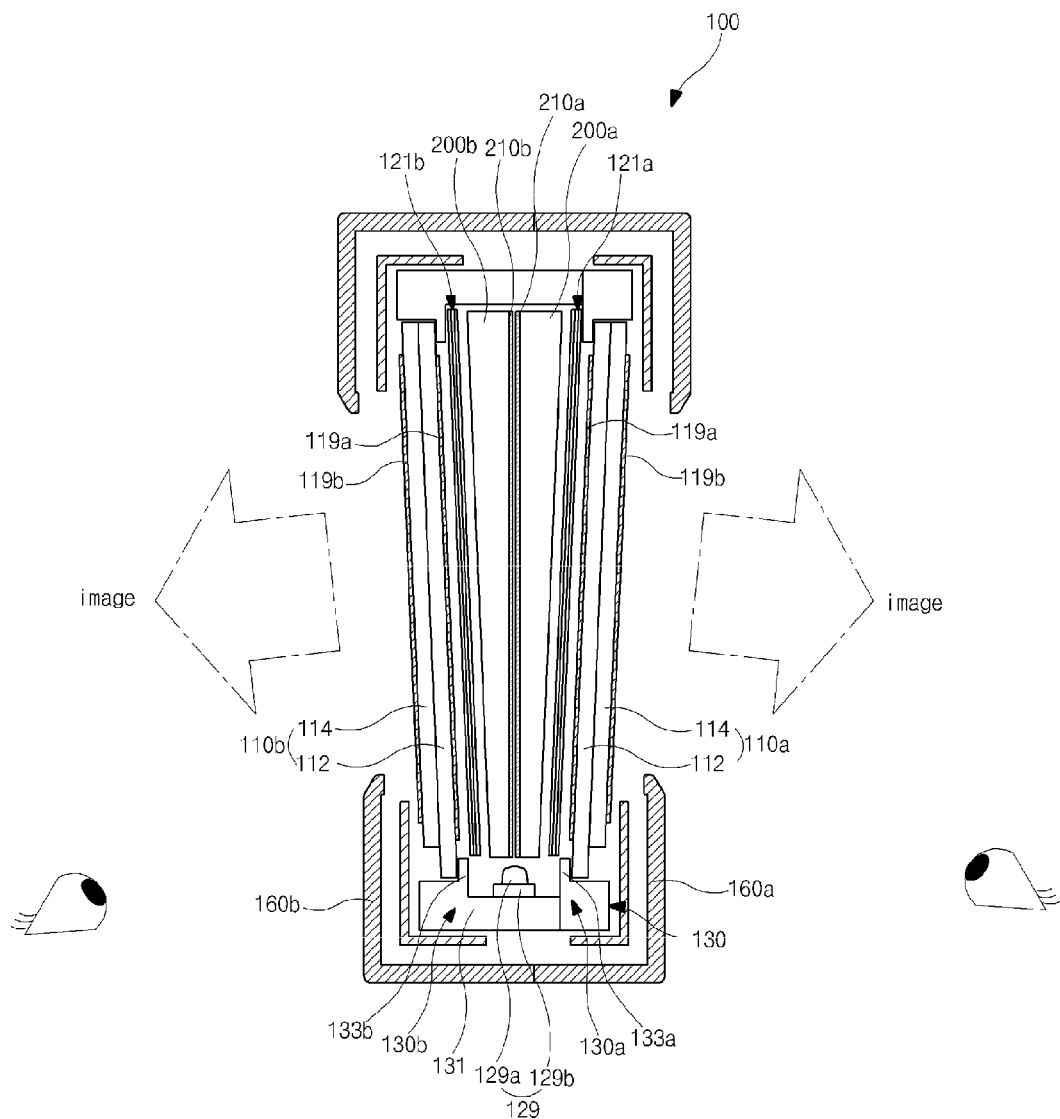

FIG. 8A and FIG. 8B are cross-sectional views of schematically illustrating a display device that includes a two-way LCD device having a light guide plate according to another exemplary embodiment of the present invention.

In FIG. 8A, first and second front covers 160a and 160b cover edges of both displaying surfaces of the two-way LCD device and are combined with each other to form one-united body. The first and second front covers 160a and 160b and the two-way LCD device constitute the display device 100.

Here, the two-way LCD device includes a backlight unit 120 of FIG. 6 comprising first and second light guide plates 200a and 200b, an LED assembly 129 at side surfaces of the first and second light guide plates 200a and 200b and first and second optical sheets 121a and 121b over outer surfaces of the first and second light guide plates 200a and 200b, substantially over a right surface of the first light guide plate 200a and a left surface of the second light guide plate 200b, respectively, in the context of the figure. The two-way LCD device further includes first and second liquid crystal panels 110a and 110b over and under the backlight unit 120 of FIG. 6, substantially at right and left sides of the backlight unit 120 of FIG. 6, respectively, in the context of the figure. Each of the first and second liquid crystal panels 110a and 110b includes first and second substrates 112 and 114 and a liquid crystal layer (not shown) therebetween.

Polarizers 119a and 119b are attached to front and rear surfaces of each of the first and second liquid crystal panels 110a and 110b.

Sides of the backlight unit 120 of FIG. 6 and the first and second liquid crystal panels 110a and 110b are surrounded by a support main 130. The first and second liquid crystal panels 110a and 110b and the backlight unit 120 of FIG. 6 are modularized with the first and second top covers 140a and 140b and the support main 130.

Here, each of the first and second light guide plates 200a and 200b has a thickness increasing from a first surface, which corresponds to the LED assembly 129 and light from the LED assembly 129 is incident on, to a second surface, which is opposite to the first surface.

Specially, upper surfaces of the first and second light guide plates 200a and 200b facing the first and second liquid crystal panels 110a and 110b are inclined with respect to lower surfaces of the first and second light guide plate 200a and 200b, which are parallel to each other and opposite to the upper surfaces, such that the first and second light guide plates 200a and 200b have increasing thicknesses as it goes far from the LED assembly 129.

When the display device 100 is used upright, the second surfaces of the first and second light guide plates 200a and 200b are disposed down in the context of the figure. Thus, the display device 100 is implemented such that the front viewing angle normal to the displaying surfaces of the two-way LCD device faces upward.

Thus, even though the display device 100 is placed under the eye-level of the viewer, the viewer does not need to lower the eye-level.

On the contrary, in FIG. 8B, when the display device 100 is placed over the eye-level of the viewer, the display device 100 may be implemented such that the second surfaces of the first and second light guide plates 200a and 200b are disposed up in the context of the figure and the front viewing angle faces downward.

In the two-way LCD device of the present invention, the first and second light guide plates 200a and 200b have different thicknesses at the first and second surfaces opposite to each other, and the display device 100 can be placed upright depending on the eye-level of the viewer when the two-way LCD device is used for the display device 100 such as a monitor for a personal computer.

As stated above, in the two-way LCD device according to the second embodiment of the present invention, the edge-type backlight unit 120 of FIG. 6 is used for a plane light source, and it is possible to provide the two-way LCD device having light weight and thin thickness.

Moreover, the edge-type backlight unit 120 of FIG. 6 provides the plane light source to the first and second liquid crystal panels 110a and 110b, and there are more effects on the light weight and thin thickness of the two-way LCD device. Thus, the manufacturing costs of the two-way LCD device can be decreased.

Furthermore, the support main 130 is divided into the first and second parts 130a and 130b to surround the first and second liquid crystal panels 110a and 110b, respectively. Therefore, it is further easy to modularize the two-way LCD device.

Since the first and second light guide plates 200a and 200b have different thicknesses at the first surface corresponding to the LED assembly 129 and the second surfaces opposite to the first surface, the two-way LCD device has non-uniform thickness. The display device 100 can be placed upright depending on the eye-level of the viewer when the two-way LCD device is used for the display device 100 such as a monitor for a personal computer.

Here, the backlight unit 120 of FIG. 6 having the above-mentioned structure may be referred to as a sidelight type. A plurality of LED assemblies 129 may be arranged at inner surfaces of the support main 130 facing each other along a length direction thereof, and more than one LED assemblies 129 may be disposed at each of the inner surfaces of the support main 130.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A two-way liquid crystal display device, comprising:
   first and second liquid crystal panels;
   a backlight unit disposed between the first and second liquid crystal panels and including an LED assembly and a light guide plate, wherein the LED assembly is disposed at a side surface of the light guide plate and the light guide plate includes predetermined patterns at first and second surfaces thereof facing the first and second liquid crystal panels, respectively; and
   a support main including a first part guiding the first liquid crystal panel and a second part guiding the second liquid crystal panel and the back light unit,
   wherein light emitted from the LED assembly is guided by the light guide plate and is provided to the first and second liquid crystal panels,
   wherein the first part directly contacts an outer surface of the first liquid crystal panel, and the second part directly contacts an outer surface of the second liquid crystal panel facing the outer surface of the first liquid crystal panel; and
   wherein the first part is combined with a first top cover and the second part is combined with a second top cover such that the first and second top covers are two separate elements.

2. The device according to claim 1, wherein the predetermined patterns at the first surface of the light guide plate have a different density and size from the predetermined patterns at the second surface of the light guide plate.

3. The device according to claim 2, wherein the predetermined patterns at the first and second surfaces of the light guide plate include elliptical patterns, polygonal patterns or hologram patterns.

4. The device according to claim 1, wherein the light guide plate has different thicknesses at the side surface and a counter side surface opposite to the side surface, respectively.

5. The device according to claim 4, wherein the device is used upright with respect to a viewer, wherein one of the side surface and the counter side surface of the light guide plate having a thicker thickness is disposed up when the device is placed under an eye-level of the viewer, and wherein the one of the side surface and the counter side surface of the light guide plate having the thicker thickness is disposed down when the device is placed over the eye-level of the viewer.

6. The device according to claim 1, wherein the first part has a first protruding portion supporting the first liquid crystal panel at an inner surface of the first part and the second part has a second protruding portion supporting the second liquid crystal panel at an inner surface of the second part.

7. The device according to claim 1, wherein:
   the first top cover covers edges of a front surface and side surfaces of the first liquid crystal panel; and
   the second top cover covers edges of a front surface and side surfaces of the second liquid crystal panel.

8. The device according to claim 1, wherein first optical sheets are disposed between the first liquid crystal panel and the light guide plate and second optical sheets are disposed between the second liquid crystal panel and the light guide plate.

9. The device according to claim 8, wherein the first and second optical sheets include a diffuser sheet and a light-concentrating sheet.

10. A two-way liquid crystal display device, comprising:
    first and second liquid crystal panels;
    a backlight unit disposed between the first and second liquid crystal panels and including an LED assembly and first and second light guide plates, wherein the LED assembly is disposed at side surfaces of the first and second light guide plates; and
    a support main including a first part guiding the first liquid crystal panel and a second part guiding the second liquid crystal panel and the back light unit,
    wherein light emitted from the LED assembly is guided by the first and second light guide plates and is provided to the first and second liquid crystal panels,
    wherein the first part directly contacts an outer surface of the first liquid crystal panel, and the second part directly contacts an outer surface of the second liquid crystal panel facing the outer surface of the first liquid crystal panel; and
    wherein the first part is combined with a first top cover and the second part is combined with a second top cover such that the first and second top covers are two separate elements.

11. The device according to claim 10, wherein the first and second light guide plates include predetermined patterns at inner surfaces thereof, which are opposite to outer surfaces facing the first and second liquid crystal panels, respectively.

12. The device according to claim 11, wherein the predetermined patterns at the inner surface of the first light guide plate have a different density and size from the predetermined patterns at the inner surface of the second light guide plate.

13. The device according to claim 12, wherein the predetermined patterns at the inner surfaces of the first and second light guide plates include elliptical patterns, polygonal patterns or hologram patterns.

14. The device according to claim 10, wherein each of the first and second light guide plates has different thicknesses at the side surface and a counter side surface opposite to the side surface, respectively.

15. The device according to claim 14, wherein outer surfaces of the first and second light guide plates facing the first and second liquid crystal panels are inclined with respect to inner surfaces of the first and second light guide plates, which are opposite to the outer surfaces and parallel to each other.

16. The device according to claim 15, wherein each of the first and second light guide plates has a first thickness at the side surface and a second thickness at the counter side surface, and wherein the first thickness is thinner than the second thickness.

17. The device according to claim 15, wherein the device is used upright with respect to a viewer, wherein one of the side surface and the counter side surface of the light guide plate having a thicker thickness is disposed up when the device is placed under an eye-level of the viewer, and wherein the one of the side surface and the counter side surface of the light guide plate having the thicker thickness is disposed down when the device is placed over the eye-level of the viewer.

18. The device according to claim 10, wherein the first part has a first protruding portion supporting the first liquid crystal panel at an inner surface of the first part and the second part has a second protruding portion supporting the second liquid crystal panel at an inner surface of the second part.

19. The device according to claim 10, wherein:
   the first top cover covers edges of a front surface and side surfaces of the first liquid crystal panel; and
   the second top cover covers edges of a front surface and side surfaces of the second liquid crystal panel.

20. The device according to claim 10, wherein first optical sheets are disposed between the first liquid crystal panel and the first light guide plate and second optical sheets are disposed between the second liquid crystal panel and the second light guide plate.

* * * * *